United States Patent [19]

Gill

[11] 4,409,932

[45] Oct. 18, 1983

[54] METHOD AND APPARATUS FOR POWERING ENGINE WITH EXHAUST GENERATED STEAM

[75] Inventor: Peter A. Gill, Arlington, Tex.

[73] Assignee: Scoron Corporation, Arlington, Tex.

[21] Appl. No.: 328,377

[22] Filed: Dec. 7, 1981

[51] Int. Cl.³ .................................. F02M 25/02
[52] U.S. Cl. ........................ 123/25 D; 123/25 P; 123/25 N; 123/25 C
[58] Field of Search ............... 123/25 B, 25 C, 25 D, 123/25 P, 25 N

[56] References Cited

U.S. PATENT DOCUMENTS

| 899,625 | 9/1908 | Schneider et al. | 123/25 N |
|---|---|---|---|
| 1,088,292 | 2/1914 | Milne | 123/25 D |
| 1,676,264 | 7/1928 | Hill | 123/25 D |
| 1,698,468 | 1/1929 | Beals | 123/25 N |
| 2,919,540 | 1/1960 | Percival | 123/25 P |
| 3,842,808 | 10/1974 | Gataldo | 123/25 P |
| 4,018,192 | 4/1977 | Eft | 123/25 C |
| 4,030,453 | 6/1977 | Sugimoto | 123/25 P |
| 4,078,527 | 3/1978 | Yasuda | 123/25 D |
| 4,122,803 | 10/1978 | Miller | 123/25 P |
| 4,197,819 | 4/1980 | Mahoney et al. | 123/25 P |

Primary Examiner—Ira S. Lazarus
Attorney, Agent, or Firm—Richards, Harris & Medlock

[57] ABSTRACT

An apparatus (10) for installation in an automobile (12) to generate steam with heat from the exhaust of an engine (14) is provided. The steam is generated at a sufficient pressure for entry into the combustion chambers of the engine to increase the power output of the engine. The apparatus includes a water storage unit (20) and a steam generator (26) for generating steam with the water from the unit through transfer of heat from combusted gases in the exhaust system (18). The steam travels through steam inlet manifolds (30, 32) for entry into the combustion chambers. The entry is controlled by a cylinder injection timing valve assembly (38) timed to the operation of the engine to enter the steam during the power stroke. A steam throttling control valve assembly (50) is provided to throttle the steam input to the cmbustion chambers. A throttle proportioning control unit (70) proportions the carburetor throttle and steam throttle assembly to the operator throttle input to provide the greatest efficiency in engine operation. The throttle proportioning control unit (70) operates in response to the steam temperature and pressure within the steam generator (26). The apparatus (10) may be adapted for use on an engine design for solely air fuel combustion with the cylinder adapter (56). A throttle linkage interchange unit may be provided to initiate operation of steam input only upon reaching a minimum engine temperature. An intake manifold vacuum control valve (170) may be provided for selectively entering exhaust gases into the intake manifold of the engine to compensate for the vacuum variation due to the steam input to the combustion chamber.

20 Claims, 8 Drawing Figures

METHOD AND APPARATUS FOR POWERING ENGINE WITH EXHAUST GENERATED STEAM

TECHNICAL FIELD

This invention relates to heat engines, and in particular to internal combustion engines.

BACKGROUND ART

The internal combustion engine is employed in uncounted applications throughout the world. The operation of the engine relies upon the combustion of fossil fuels. The existing supply of fossil fuels is, of course, limited. The recent price increases in these fuels represent, in part, the increased cost of recovery of the world's depleted reservoirs. Therefore, any apparatus or method for increasing the efficiency of an internal combustion engine is highly desirable.

Many systems have been developed to employ water or steam injection within the combustion chambers of internal combustion engines. Several systems are used to cool the cylinders by lowering combustion temperature or may be employed to reduce harmful exhaust emissions. Other systems have provided water to the combustion chamber for generation to steam to increase the pressure in the chamber. These systems all have the potential for increased thermal efficiency by employing waste heat generated by the fossil fuel combustion to power the engine.

However, none of these systems have achieved wide use. In particular, very few truck and automotive internal combustion engines employ such a system. Therefore there is a need to develop an effective inexpensive system for recycling waste heat which may be adapted for use on existent internal combustion engines.

DISCLOSURE OF THE INVENTION

In accordance with the present invention, an apparatus for use with an internal combustion engine is provided. The internal combustion engine is of the type having a combustion chamber with an opening to receive an ignition source. The engine also includes a carburetor and the combusted gases from the combustion chamber leave the chamber through an exhaust system. The apparatus includes a water storage unit for storing water. A steam generator is positioned along the exhaust system for vaporizing water from the water storage unit. A steam intake manifold is provided for entering steam generated in the steam generator into the combustion chamber. Engine timing valve structure is provided for permitting flow of the steam in the intake manifold to the combustion chamber during the power stroke to increase the energy output of the internal combustion engine. Steam throttling structure is provided for controlling the flow of steam into the combustion chamber. Throttle proportioning control structure is provided for proportioning the response of the steam throttling structure and carburetor throttle to throttle input by the operator. The proportioning is determined by the steam temperature and pressure within the steam generator.

In accordance with another aspect of the present invention, intake manifold vacuum limit structure is provided. The structure recycles exhaust gases into the intake manifold to compensate for the reduction in fuel and air intake consumption resulting from steam input.

In accordance with another aspect of the present invention, a steam valve is positioned between the steam generator and steam intake manifold. The steam valve is responsive to the ignition switch and prevents flow of steam to the steam intake manifold when the ignition switch is off.

In accordance with yet another aspect of the present invention, a liquid and vapor separator is positioned in the exhaust system downstream of the heat exchanger to recover water for return to the water storage tank.

In accordance with yet another aspect of the present invention, a throttle linkage interchange unit may be provided for activating the steam throttle structure only when the internal combustion engine operates at a temperature exceeding a predetermined minimum.

In accordance with yet another aspect of the present invention, a method for powering an internal combustion engine is provided. The engine includes at least one combustion chamber with an opening for receiving an ignition source and a carburetor. The engine exhausts combusted gases through an exhaust system.

The method includes the steps of storing water within a water storage unit and generating steam in a steam generator positioned in the exhaust system from water supplied from the water storage unit. The method further includes the step of entering the steam generated in the steam generator into the combustion chamber through a steam intake manifold.

The method includes a step of admitting steam into the combustion chamber only during the power stroke to increase the energy output of the internal combustion engine by engine timing valve structure. The steam entering the combustion chamber is throttled through steam throttle structure. Finally, the method includes a step for proportioning the response of the steam throttle structure and carburetor throttle to throttle input by the operator with the proportions being determined by the steam temperature and pressure in the steam generator.

BRIEF DESCRIPTION OF DRAWINGS

A more complete understanding of the invention may be had by reference to the following Detailed Description when taken in conjunction with the accompanying Drawings wherein.

DETAILED DESCRIPTION

Figure 1:
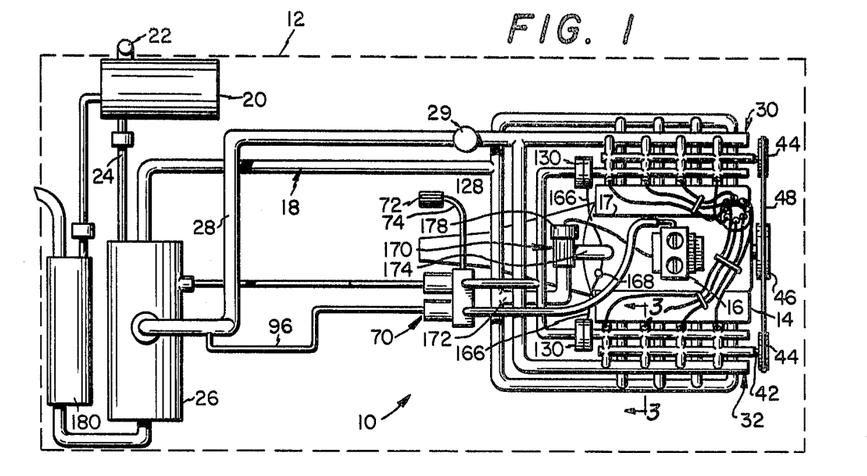
FIG. 1 is a schematic top view of an automobile in which an apparatus forming one embodiment of the present invention is incorporated.
Figure 2:
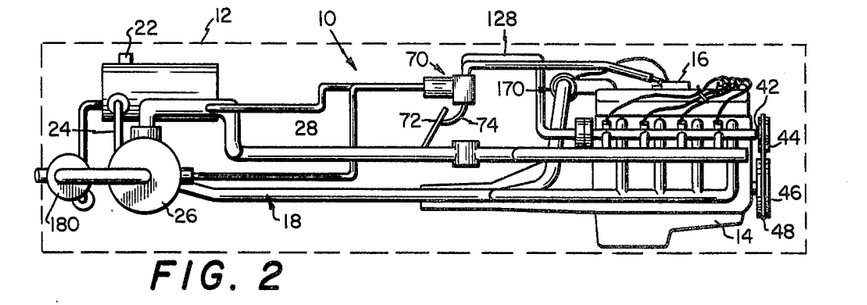
FIG. 2 is a schematic side view of the automobile illustrating the apparatus of the present invention.

Referring now to the drawings, wherein like reference characters designate like or corresponding parts throughout several views, FIGS. 1 and 2 illustrate the apparatus 10 forming an embodiment of the present invention installed in an automobile 12. The automobile 12 is powered by a conventional internal combustion engine 14. This engine may have any number of cylinders and operate on any fossil fuel, such as gasoline, diesel fuel or natural gas.

The engine 14 includes a conventional carburetor 16 for mixture of air and fuel for entry into the combustion chambers of the engine through intake manifold 17. The combusted gases are passed through an exhaust system 18 to the outside.

The apparatus 10 includes a water storage unit 20 positioned within the automobile. The unit 20 may be filled with water from an external connection 22.

A water feed line 24 extends from the unit 20 to a steam generator or boiler 26. The steam generator 26 is positioned within the exhaust system 18 so that the hot exhaust gases transfer heat to the water from the unit 20. Under normal operating conditions, the water is heated to steam by the exhaust gases and the steam produced travels through steam line 28.

The steam line 28 extends forward into the engine compartment where it branches into steam inlet manifolds 30 and 32 extending along each bank of cylinders in the engine 14. The engine 14 illustrated is of the common V-8 configuration. It will be understood that the apparatus 10 may be employed with an engine having any number of cylinders and the steam inlet manifold adapted to the particular cylinder configuration.

A steam valve 29 is positioned in the line 28. The steam valve 29 is operated by the ignition switch of the automobile to prevent steam flow therethrough when the ignition is off. The steam generator may, of course, have a pressure relief valve to limit steam pressure therein.

Figure 3:
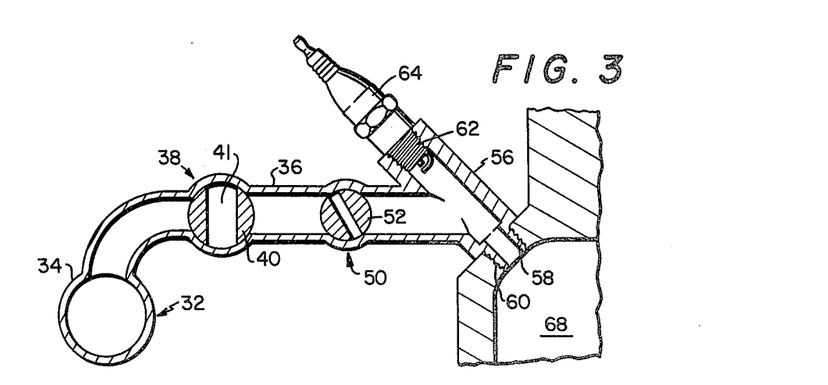
FIG. 3 is a vertical cross section of a steam intake manifold employed in the apparatus of the present invention.

The construction of each steam inlet manifold is best described with reference to FIG. 3. The manifold has a supply line 34 extending along the cylinder bank with branch lines 36 extending from the supply line to each cylinder in the engine. A cylinder injection timing valve assembly 38 is provided in each branch line which includes a rotatable valve 40. The valve 40 may be rotated so that steam flow is permitted through port 41 in valve 40 and through the branch line during a portion of its rotation and preventing steam flow during the remainder. FIG. 3 illustrates the valve 40 in a position blocking steam flow.

Each valve 40 is preferably connected to a common shaft 42. The shaft has a pulley 44 at one end thereof. The pulley 44 on each steam inlet manifold may be connected to a pulley 46 on the crank shaft through a timing belt 48. The valves 40 and pulleys are so arranged that as the engine operates, steam is permitted to flow through the timing valve assemblies at the appropriate moment to enter steam within the associated cylinder at top dead center in the power stroke of the cylinder. This permits the steam generated in the steam generator 26 to be entered into each cylinder in the engine at the appropriate moment to provide the greatest assistance to operation of the engine.

A steam throttling control valve assembly 50 is provided in each branch line 36 between the timing valve assembly 38 and its associated cylinder. The valve assembly includes a valve 52 similar in construction to valve 40. The valves 52 in each inlet manifold are tied together by a common shaft 54. Rotation of the shaft 54 permits control of the steam input to each cylinder.

Each branch line 36 extends to a cylinder adapter 56 forming a key function in apparatus 10. The cylinder adapter is provided with a threaded portion 58 adapted to be threaded in a common spark plug or ignition source port 60 in the cylinder heads of the engine 14. The adapter 56 further includes a threaded port 62 having the same thread configuration as the port 60 to receive spark plug 64 which in the conventional engine would be secured in port 60. A precombustion chamber 66 is formed within the adapter 56 into which the steam enters from the branch line and into which the spark from the plug 64 is propagated. The air fuel mixture in the combustion chamber 68 of each cylinder is ignited by the spark plug 64 at the appropriate time in the engine cycle to provide the power stroke of the cylinder. This power stroke is assisted by the steam pressure entered into the combustion chamber through the branch line 36.

To control the operation of apparatus 10, a throttle proportioning control unit 70 is provided. As in the conventional automobile, the operator controls engine speed through a foot throttle 72 and throttle linkage 74. The function of the control unit 70 is to proportion the carburetor and steam functions in the engine to achieve the most efficient combination of conventional air fuel combustion and steam power determined by the various critical operating criteria in the system.

Figure 4:
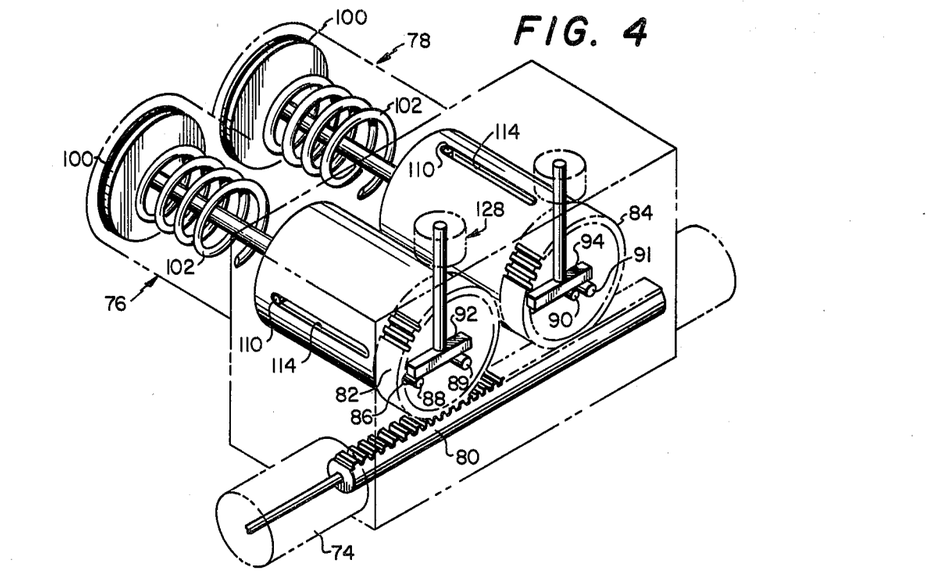
FIG. 4 is a perspective view of a throttle proportioning control unit employed in the apparatus of the present invention.
Figure 5:
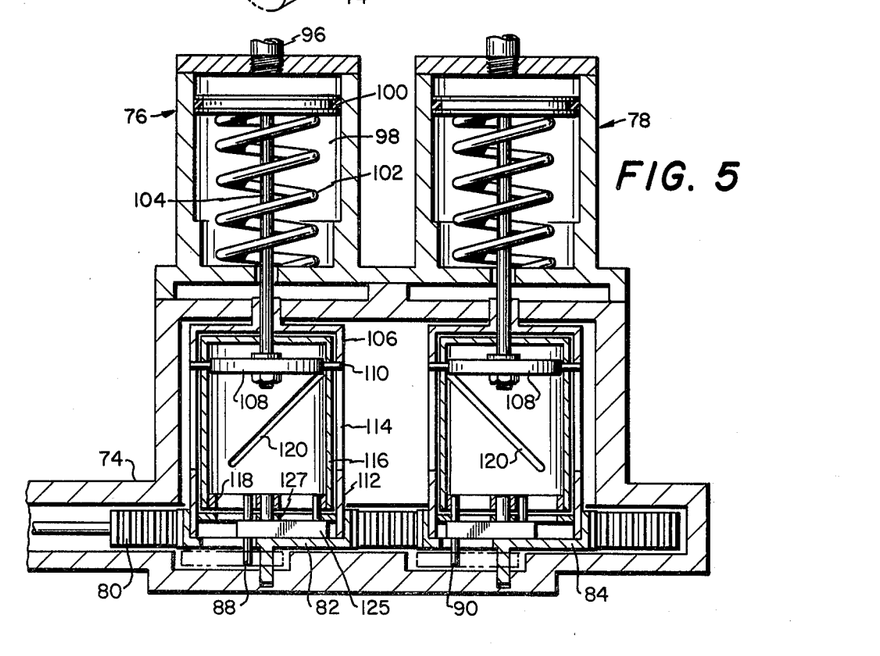
FIG. 5 is a cross sectional view of the throttle proportioning control unit.
Figure 6:
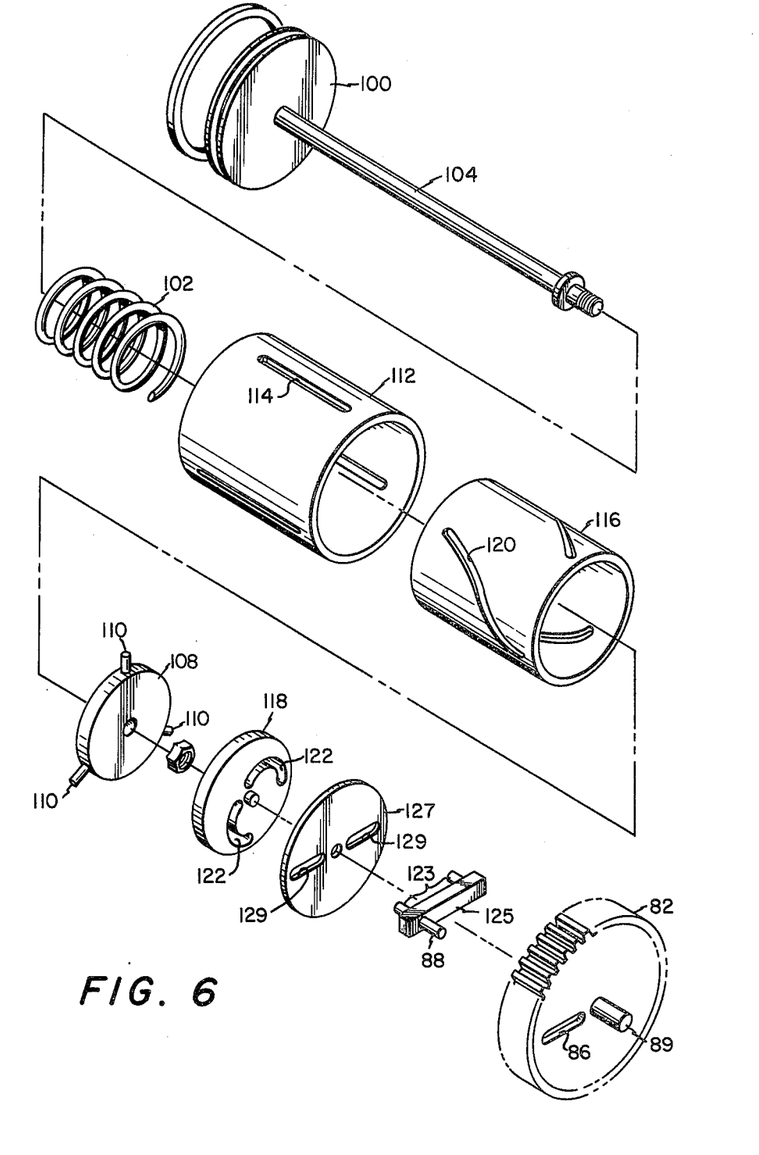
FIG. 6 is an exploded view of components in the throttle proportioning control unit.

The detail of the throttle proportioning control unit 70 is best illustrated in FIGS. 4-6.

The unit generally comprises a steam throttle proportioning assembly 76 and a carburetor throttle proportioning assembly 78. The throttle linkage 74 from the foot throttle 72 extends into the control unit and includes a toothed rack 80. The teeth of the rack engage teeth on throttle gears 82 and 84 forming a portion of assemblies 76 and 78, respectively.

Each gear has a slot 86 formed along a radial line from the center to a radial position within the teeth of the gears. Throttle pins 88 and 90 are provided to extend through the slots 86 and protrude from the sides of the gears as best shown in FIG. 4. Throttle pin 88 contacts a throttle output bar 92 which controls the position of valves 52 and the steam throttle control valve assemblies. A similar throttle output bar 94 is contacted by the throttle pin 90 to control the throttling of the carburetor 16. By varying the radial position of the throttle pins 88 and 90 within the slots 86, throttle input from the foot throttle 72 is proportioned between the carburetor and steam throttle control valve assemblies. Stops 89 and 91 centered on the axis of rotation of the gears 82 and 84 form a throttle stop to limit motion of bars 92 and 94.

The position of the throttle pins within the slots 86 are preferably determined by operating characteristics of the steam generator 26. The position of throttle pin 88 may be determined by the steam generator pressure. The position of pin 90 may be determined by the steam generator temperature.

The operation of the control unit 70 is best described with reference to the steam throttle proportioning assembly 76. The carburetor throttle proportioning assembly 78 is substantially identical in construction and in operation. In the steam throttle proportioning assembly, a steam generator steam pressure line 96 extends from the steam line 28 adjacent the boiler into a chamber 98 within assembly 76. A piston 100 is positioned within the chamber for sliding sealed contact with the walls thereof. A biasing spring 102 biases the piston towards the inlet of the line 96. A rod 104 extends from the piston 100 into a second chamber 106. The end of rod 104 in the chamber 106 mounts a displacement yoke 108 having a plurality of radially extending arms 110.

An outer drum 112 is rotatably positioned within the chamber 106 and secured to gear 82. The outer drum 112 includes a plurality of linear slots 114 along its length.

An inner drum 116 is disposed within the outer drum 112 and includes a throttle pin activating plate 118. The inner drum has a plurality of curvilinear slots 120 formed along its length. The activating plate has similar curvilinear slots 122 formed therethrough for receiving pins 123 of a slidable bar 125 mounting the throttle pin 88. The bar 125 is secured for slidable motion within the hollow center of gear 82 and a backing plate 127 forming a cover for the hollow center. The plate 127 has linear slots 129 for passage of pins 123.

In operation, the arms 110 of yoke 108 pass through both slots 114 and 120 in the inner and outer drums. The piston 100, rod 104 and yoke 108 are moved in response to the boiler pressure. As the yoke 108 is moved, the inner and outer drums rotate relative to each other which induces radial movement in the throttle pin 88 within the gear 82. The relative rotation of inner and outer drum 112 and 116 proportions the response of bar 92 to input from throttle linkage 74. By properly designing the slots 114, 120 and 122 the desired proportioning action of the steam inlet relative to boiler pressure may be achieved.

In one design constructed according to the teachings of the present invention, the steam throttle proportioning assembly 76 was designed for activation within a boiler pressure range between 150 and 1000 pounds per square inch. The carburetor throttle proportion assembly was designed to permit proportioning action in a boiler temperature range between 350° and 750° F.

The steam throttle control linkage 128 extending from the control unit 70 branches and enters a throttle linkage interchange unit 130 associated with each steam throttle control valve assembly. The function of the throttle linkage interchange unit 130 is to permit action of the steam throttling assembly to enter steam into a cylinder only after the engine 14 has achieved a minimal operating temperature.

Figure 7:
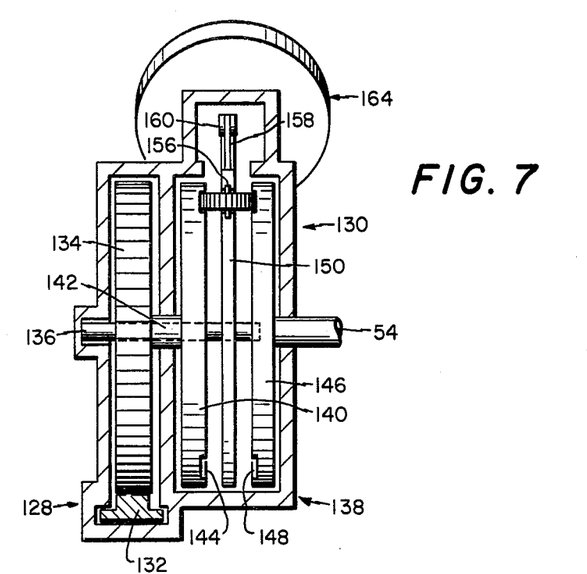
FIG. 7 is a vertical cross section of a steam throttle control valve actuator employed in the apparatus forming the present invention.
Figure 8:
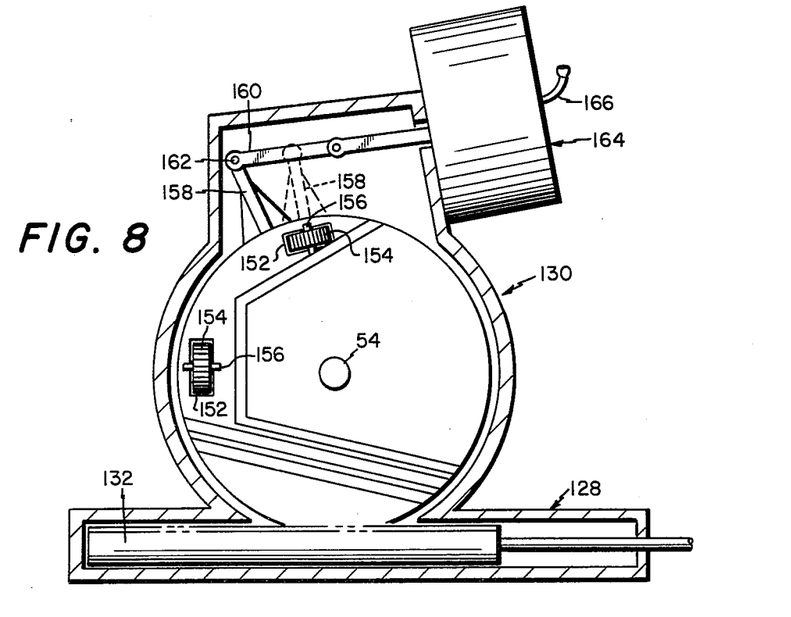
FIG. 8 is a side cross sectional view of the steam throttle control valve actuator.

The construction of the unit 130 is best illustrated in FIGS. 7 and 8. A toothed rack 132 forms the input of linkage 128 from the proportioning control unit 70. The teeth on the rack 132 cooperate with teeth on a transfer gear 134. The transfer gear is floatably supported on a shaft 136 which extends into a throttle control valve actuator assembly 138. An input cluster gear 140 is secured for rotation with the transfer gear 134 by separator 142. The gear 140 is also floatably supported on shaft 136. The gear includes an annular gear rack 144.

On the opposite side of the actuator assembly, an output cluster gear 146 is rotatably mounted. The shaft 54 is secured to the gear so that rotation of the gear operates each valve 52 secured to the shaft. The inner face of the gear 146 includes an annular rack 148 substantially identical to rack 144.

A planetary disc 150 is rotatably mounted within the assembly and secured on the shaft 136. The shaft is rotatably supported by part of the casing of the unit 130 and by a depression in the gear 146 as shown. The disc 150 includes a number of slots 152 for receiving gear wheels 154. The gear wheels are maintained in the slot by pins 156 and are free to rotate. The teeth of the gear wheels engage both racks 144 and 148.

An extension 158 on the disc 150 extends outward for connection to a linkage 160. The linkage includes a yoke securing a pin 162 between its arms for pivotally securing the linkage to the extension. The linkage extends to an air operated diaphragm 164.

The diaphragm 164 is connected to the intake manifold through a line 166. A temperature sensing valve 168 is positioned in the line 166 and operated in response to the temperature of engine 14. When the engine is cold, the valve will be closed preventing actuation of the diaphragm. When a predetermined operating temperature is achieved, the value opens to draw a vacuum within the diaphragm. The diaphragm actuates the linkage and disc 150 from the position shown in dotted line in FIG. 7 to the position shown in full line. This motion permits the steam throttle control valve assemblies 50 to become active to admit steam into the combustion chambers upon activation of the steam throttle input from control unit 70.

When apparatus 10 is employed in an automobile adapted for use with air fuel combustion alone, provisions must be taken to correct the deviation in intake manifold pressure resulting from the reduced requirements for air fuel mixture. An intake manifold vacuum control valve 170 is mounted on the engine to remedy this condition. Valve 170 is substantially identical in construction and operation to an exhaust gas recirculation valve (E.G.R. valve) found on many automobiles. It is possible the existing E.G.R. valve in the automobile 12 may be adapted to perform the function of valve 170. A branch line 172 extends from the exhaust system 18 into the control valve. A line 174 extends from the control valve into the intake manifold 17 of the engine. A diaphragm 178 is provided on the valve which is exposed to atmospheric pressure on one side and to the vacuum of the intake manifold on the other. When the vacuum decreases below the present level, the diaphragm deflects and activates the value to permit exhaust gases to flow from exhaust system 18, through lines 172 and 174, and into the intake manifold 17. The control valve therefore senses the manifold pressure and causes a regulated quantity of exhaust gas to be recycled and flow into the intake manifold to correct the pressure variation induced by the steam power input to the engine. In one design constructed according to the teaching of the present invention, the control valve is designed to begin operation at vacuums less than 25 inches of mercury within the intake manifold.

An exhaust liquid and vapor separator 180 is positioned in the exhaust system 18 downstream of the steam generator 26. The separator acts to cool the exhaust gases and collect the water entrained therein. The water is returned to the water storage unit 20 to recycle a portion of the water used in apparatus 10. This reduces the water consumption from the storage unit and permits the automobile to operate for longer time intervals before the necessity of refilling the water storage tank.

The apparatus 10 therefore provides a device for utilizing the waste heat of the engine 14 by generating steam which, in turn, assists in operating the engine. The apparatus 10 permits the engine to be operated under the same load conditions with a lower requirement of fuel. Therefore, the cost of operation is reduced.

One very important feature of apparatus 10 is the ability to readily and simply incorporate the apparatus into an automobile designed for operation solely on fuel combustion. Every component of the apparatus is designed to be mounted in an automobile without interfering with the operation of the components already used. It will be understood however that the apparatus may be incorporated into the initial design of an automobile if desired.

Another substantial advantage of the present invention is the presence of automatic control components. This permits the operator to drive an automobile equipped with the apparatus 10 with minimum orientation. The system automatically balances the relative input of fuel and steam to render the most efficient operation of the automobile.

Although a single embodiment of the invention has been illustrated in the accompanying drawings and described in the foregoing Detailed Description, it will be understood that the invention is not limited to the embodiments disclosed, but is capable of numerous rearrangements, modifications and substitutions of parts and elements without departing from the spirit of the invention.

I claim:

1. An apparatus for use with an internal combustion engine operated through throttle input by an operator having at least one combustion chamber with a carburetor having a throttle, the combusted gases leaving the combustion chamber through an exhaust system, comprising:
   a water storage unit for storing water;
   a steam generator positioned along the exhaust system for vaporizing water from said water storage unit with heat from the combusted gases;
   a steam intake manifold for entering steam generated in said steam generator into said at least one combustion chamber;
   engine timing valve means for permitting flow of steam from said steam intake manifold to said at least one combustion chamber during the power stroke to increase the energy output of the internal combustion engine;
   steam throttling means for controlling the flow of steam into said at least one combustion chamber; and
   throttle proportioning control means for proportioning the response of said steam throttle means and the carburetor throttle to throttle input by the operator, the proportions being determined by the steam temperature and pressure in said steam generator.

2. The apparatus of claim 1 wherein the engine has an intake manifold, said apparatus further comprising intake manifold vacuum limit means for entering combusted gases into the intake manifold to compensate for the vacuum variation in the intake manifold resulting from steam input in said at least one combustion chamber.

3. The apparatus of claim 1 wherein the engine is activated by an ignition switch, said apparatus further comprising a steam valve for controlling steam flow between said steam generator and said steam intake manifold, said steam valve being responsive to said ignition switch and preventing flow of stream to said steam intake manifold when the ignition switch is off.

4. The apparatus of claim 1 further comprising a liquid and vapor separator positioned in the exhaust system downstream of said steam generator for recovering water in the exhaust gases for return to said water storage tank.

5. The apparatus of claim 1 further comprising a throttle linkage interchange unit for activating said steam throttling means to control the flow of steam into said at least one combustion chamber only when the internal combustion engine operates at a temperature exceeding a predetermined minimum.

6. The apparatus of claim 1 wherein the engine includes an opening into said at least one combustion chamber to receive an ignition source, said steam intake manifold including a cylinder adapter for engagement with the engine through the opening to receive an ignition source and having a chamber in communication with said at least one combustion chamber, steam from said steam intake manifold entering the chamber of said cylinder adapter for entry into the combustion chamber, the ignition source being received by said cylinder adapter in communication with the combustion chamber.

7. The apparatus of claim 1 wherein said throttle propportioning control means includes steam and carburetor throttle proportioning assemblies for controlling response of said steam throttling means and carburetor throttle, respectively, to throttle input by the operator, the proportioning of said steam throttle proportioning assembly being determined by the steam pressure in said steam generator and the proportioning of said carburetor throttle proportioning assembly being determined by the steam temperature in said steam generator.

8. An apparatus for use with an internal combustion engine having at least one combustion chamber, a carburetor having a throttle operating in response to engine throttle input by an operator for mixing fuel and air and an intake manifold for entering the fuel air mixture into the combustion chamber for combustion, the combusted gases passing through an exhaust system, comprising:
   a water storage unit for storing water;
   a steam generator positioned along the exhaust system for vaporizing water from said water storage unit with heat from the combusted gases;
   at least one steam intake manifold for entering steam generated in said steam generator into said at least one combustion chamber;
   a steam injection timing valve assembly positioned in said steam intake manifold and operated in response to the engine timing for permitting steam flow therethrough for entering steam into said at least one combustion chamber during the power stroke of the associated cylinder, the steam having a greater pressure than the air fuel mixture in the combustion chamber to increase the power output of the engine;
   a steam throttle control valve assembly positioned in said steam intake manifold for regulating the steam input to said at least one combustion chamber;
   a throttle proportioning control unit for operating said steam throttle control valve assembly and the carburetor throttle in response to input by an operator to the engine throttle, said throttle proportioning control unit proportioning the operation of said steam throttle control valve assembly and the carburetor throttle to achieve greatest engine efficiency by sensing the steam pressure and temperature in said steam generator; and an intake manifold vacuum control valve for selectively entering combusted gases into the intake manifold to compensate for the variation in intake manifold vacuum resulting from the additional power input by entry of steam in said at least one combustion chamber.

9. The apparatus of claim 8 wherein the engine includes an ignition switch, said apparatus further comprising a steam valve for controlling steam flow between said steam generator and said at least one steam intake manifold, said steam valve being responsive to the ignition switch and preventing flow of steam to said steam intake manifold when the ignition switch is off.

10. The apparatus of claim 8 further comprising a liquid and vapor separator positioned in the exhaust system for passage of combusted gases therethrough subsequent to flow through said steam generator for recovering water in the exhausted gases for return to said water storage tank.

11. The apparatus of claim 8 further comprising a throttle linkage interchange unit for activating said steam throttle control valve assembly only when the internal combustion engine operates at a temperature exceeding a predetermined minimum.

12. The apparatus of claim 8 wherein the engine includes an opening into said at least one combustion chamber for mounting an ignition source, said steam intake manifold including a cylinder adapter for engagement with the engine at the opening and including a chamber in communication with said at least one combustion chamber and steam flow within said steam intake manifold, said cylinder adapter further having an opening to receive the ignition source to combust the air fuel mixture in the chamber and said at least one combustion chamber.

13. The apparatus of claim 8 wherein said throttle proportioning control unit includes a steam and carburetor throttle proportioning assembly for controlling response of said steam throttle control valve assembly and the carburetor throttle, respectively, each of said assemblies having a gear means rotatably mounted therein directly connected to the operator engine throttle input, operator input to the engine throttle rotating said gear means, said gear means further having a radial slot formed therein, said assemblies further comprising a throttle pin inserted through said radial slot for activating said steam throttle control valve assembly or carburetor throttle, the radial motion of said throttle pin within said slot proportioning the response, said assemblies further comprising a throttle pin activating plate having at least one curvilinear slot through which said throttle pin extends and sensing means for sensing a steam condition in said steam generator to rotate said activating plate relative to said gear means to move said throttle pin radially within said slot.

14. An apparatus for use with an internal combustion engine having at least one combustion chamber, a carburetor having a throttle for mixing fuel and air and an intake manifold for entering the fuel and air mixture into the combustion chamber for combustion, the combusted gases passing through an exhaust system and an engine throttle for input by an operator, comprising:
 a water storage unit for storing water;
 a steam generator positioned along the exhaust system for vaporizing water from said water storage unit with heat from the combusted gases;
 at least one steam intake manifold for entering steam generated in said steam generator into said at least one combustion chamber;
 a steam injection timing valve assembly positioned in said at least one steam intake manifold and operated in response to the engine timing for permitting steam flow therethrough for entering steam into said at least one combustion chamber during the power stroke of the associated cylinder, the steam entering the combustion chamber being at a greater pressure than the air fuel mixture within the combustion chamber to increase the power output of the engine;
 a steam throttle control valve assembly positioned in said at least one steam intake manifold for regulating the steam input to said at least one combustion chamber;
 a throttle proportioning control unit for operating said steam throttle control valve assembly and the carburetor throttle in response to input by the operator to the engine throttle, said throttle proportioning control unit proportioning the operation to achieve greatest engine efficiency, said throttle proportioning control unit including steam and carburetor throttle proportioning assemblies for controlling response of said steam throttle control valve assembly and carburetor throttle, respectively, each of the assemblies having a gear means rotatably mounted therein and directly connected to the engine throttle so that input by the operator rotates said gear means, said gear means further having a radial slot formed therein, said assemblies each further including a throttle pin inserted through said radial slot for activating said steam throttle control valve assembly or carburetor assembly, the radial motion of said throttle pin within said slot proportioning the response of each assembly, each of said assemblies further including a throttle pin activating plate having at least one curvilinear slot therein for passage of said throttle pin, an outer barrel secured to said throttle pin activating plate having at least one elongate slot formed therein and an inner drum positioned within said outer drum having at least one curvilinear slot formed therein, each of said assemblies further comprising a piston assembly having a displacement yoke with arms passing through said slots in said inner and outer drums and moving in response to steam pressure in said steam generator in steam throttle proportioning assembly and steam temperature in said steam generator in said carburetor throttle proportioning assembly within said steam generator, movement of said piston assembly rotating said inner and outer drums with respect to each other to rotate said activating plate relative to said gear means to move said throttle pin to proportion the response; and
 an intake manifold vacuum control valve for entering combusted gases into the intake manifold to compensate for the vacuum variation in the intake manifold resulting from the additional power input of the steam.

15. The apparatus of claim 14 wherein the engine is operated by an ignition switch, said apparatus further comprising a steam value for controlling steam flow between said steam generator and said steam intake manifold, said steam valve being responsive to said ignition switch and preventing flow of steam to said intake manifold when the ignition switch is off.

16. The apparatus of claim 14 further comprising a liquid vapor separator positioned in the exhaust system for passage of combusted gases subsequent to passage through said heat exchanger, said separator recovering water in the exhaust gases for return to said water storage tank.

17. The apparatus of claim 14 further comprising a throttle linkage interchange unit for activating said at least one steam throttle control valve assembly only when the engine operates at a temperature exceeding a predetermined minimum.

18. The apparatus of claim 14 wherein the engine includes an opening into said at least one combustion chamber for securing an ignition source, said at least one steam intake manifold including a cylinder adapter for engagement with the opening and forming a chamber therein in communication with the combustion chamber and steam flow through said steam intake manifold, said cylinder adapter further having an opening to receive the ignition source for igniting the air fuel mixture in the chamber and combustion chamber.

19. A method for powering an internal combustion engine, the engine responding to operator throttle input having at least one combustion chamber, a carburetor having a throttle for mixing fuel and air, an intake manifold for entering the air fuel mixture within the combustion chamber and an exhaust system for exhausting the combusted gases, comprising the steps of:
   storing water within a water storage unit;
   generating steam with water from said water storage unit within a steam generator positioned along the exhaust system with heat from the combusted gases;
   entering the steam generated in said steam generator into the combustion chamber through a steam intake manifold;
   timing the input of steam into the combustion chamber through said steam intake manifold by engine timing valve means for entry during the power stroke of the cylinder forming the combustion chamber to increase the energy output of the internal combustion engine;
   controlling the flow of steam into the combustion chamber by steam throttling means; and
   proportioning the response of said steam throttling means and carburetor throttle to engine throttle input by the operator, the proportioning being determined by the steam temperature and pressure in said steam generator.

20. A method for powering an internal combustion engine having at least one combustion chamber, a carburetor for mixing fuel and air and an intake manifold for entering the fuel air mixture into the combustion chamber for combustion, the combusted gases passing through an exhaust system, the engine being operated through an engine throttle by an operator, comprising the steps of:
   storing water within a water storage unit;
   generating steam with water from said water storage unit in a steam generator positioned along the exhaust system with heat from the combusted gases;
   entering steam generated in said steam generator into the combustion chamber through a steam intake manifold;
   timing the input of the steam into the combustion chamber in response to the engine timing by a steam injection timing valve assembly positioned in the steam intake manifold for entering steam into the combustion chamber during the power stroke of the cylinder forming the combustion chamber, the steam pressure exceeding the pressure of the air fuel mixture within the combustion chamber to increase the power output of the engine;
   regulating the steam input to the combustion chamber by a steam throttle control valve assembly positioned in said steam intake manifold;
   proportioning the operation of said steam throttle control valve assembly and the carburetor throttle in response to input by the operator to the engine throttle by a throttle proportioning control unit, the proportioning being determined by sensing the steam pressure and temperature in said steam generator to achieve greatest engine efficiency; and
   activating said steam throttle contrl valve assembly only when the engine has achieved a minimum operating temperature by a throttle linkage interchange unit positioned between said throttle proportioning control unit and said steam throttle control valve assembly.

* * * * *